United States Patent
Nikitenko

(10) Patent No.: US 12,106,417 B1
(45) Date of Patent: *Oct. 1, 2024

(54) EMULATION PIPELINE SELECTION AND EMULATION PIPLELINE PARAMETER PREDICTION

(71) Applicant: PARALLELS INTERNATIONAL GmbH, Schaffhausen (CH)

(72) Inventor: Evgeny Nikitenko, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,070

(22) Filed: Mar. 21, 2023

Related U.S. Application Data

(63) Continuation of application No. 17/213,714, filed on Mar. 26, 2021, now Pat. No. 11,640,689.

(51) Int. Cl.
*G06T 15/00* (2011.01)
*G06F 9/455* (2018.01)

(52) U.S. Cl.
CPC ........ *G06T 15/005* (2013.01); *G06F 9/45545* (2013.01); *G06F 9/45558* (2013.01); *G06F 2009/45583* (2013.01)

(58) Field of Classification Search
CPC ............... G06T 15/005; G06F 9/45545; G06F 9/45558; G06F 2009/45583
See application file for complete search history.

(56) References Cited

U.S. PATENT DOCUMENTS

| | | |
|---|---|---|
| 9,792,134 B1 | 10/2017 | Whaley |
| 2013/0155083 A1* | 6/2013 | McKenzie .......... G06F 9/45558 345/522 |
| 2018/0114290 A1* | 4/2018 | Paltashev ................ G06T 1/20 |
| 2018/0165787 A1 | 6/2018 | Bolz |
| 2018/0350027 A1* | 12/2018 | Rusin .................... G06T 15/005 |

* cited by examiner

*Primary Examiner* — Maurice L. McDowell, Jr.
*Assistant Examiner* — Donna J. Ricks
(74) *Attorney, Agent, or Firm* — Rosenberg, Klein & Lee

(57) ABSTRACT

Incompatible graphics frameworks present a barrier to emulating applications of one operating system (guest OS) upon a computer system employing a different operating system (host OS) such as occurs with virtual machines. Accordingly, in order to address limitations of emulating guest OS graphic pipelines upon the host OS the inventors have established methodologies for cross-platform graphics pipeline emulation, thus enabling efficient implementations of cross-platform virtualization solutions, through the establishment of emulation keys to support generic and specific graphics pipelines together with caching sets of graphical pipelines for subsequent retrieval and execution.

11 Claims, 7 Drawing Sheets

EMULATION PIPELINE SELECTION AND EMULATION PIPLELINE PARAMETER PREDICTION

CROSS-REFERENCE TO RELATED APPLICATIONS

This patent application claims the benefit of priority as a continuation of U.S. patent application Ser. No. 17/213,714 filed Mar. 26, 2021; the entire contents of which are incorporated herein by reference.

FIELD OF THE INVENTION

This patent application relates to graphics pipelines and more specifically to the emulation of one graphics pipeline within another graphics pipeline to support either features of the graphics pipeline not supported by the other graphics pipeline or address issues with respect to employing the emulated graphics pipeline within the other graphics pipeline.

BACKGROUND OF THE INVENTION

A graphics pipeline is a software- and/or hardware-implemented function that converts three-dimensional (3D) model data (e.g., utilized by a gaming, virtual reality, simulation, design and/or other application) to two-dimensional (2D) graphics data, which is suitable for displaying on one or more display devices. However, cross-platform virtualization via virtual machines may involve running a virtual machine ("guest") on a host platform that is different from the guest platform (e.g., running Windows™ applications on a macOS™ host). Accordingly, within various cross-platform virtualization implementations, the graphics frameworks employed by the two platforms may not be fully compatible.

The incompatibility of graphics frameworks may be within, for example, the configuration of the graphics pipeline, one or more pipeline stages implemented within software, or the hardware implementing one or more pipeline stages. Accordingly, the inventors have established methodologies within the present disclosure to utilize cross-platform graphics pipeline emulation, thus enabling efficient implementations of cross-platform virtualization solutions. Whilst the exemplary implementations described herein are directed to emulating Direct3D™ graphics pipelines using Metal™ graphics framework, systems, software and methods of the present disclosure may be utilized for other graphics pipeline emulation using other graphics frameworks, including pipeline emulation for Vulkan™ by the Khronos Group Inc. for example.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to graphics pipelines and more specifically to the emulation of one graphics pipeline within another graphics pipeline to support either features of the graphics pipeline not supported by the other graphics pipeline or address issues with respect to employing the emulated graphics pipeline within the other graphics pipeline.

In accordance with an embodiment of the invention there is provided a method comprising:
   generating upon a computer system an emulation key relating to a graphic pipeline for an application executing within a virtual machine associated with a guest operating system (OS) upon the computer system;
   establishing whether a cached pipeline object exists within a memory cache accessible to the computer system in dependence upon the emulation key;
   upon a positive determination that the cached pipeline object exists using one or more previously established graphic pipelines defined by the established cached pipeline object; and
   upon a negative determination that the cached pipeline object exists creating one or more new graphic pipelines; wherein
   either the one or more previously established graphic pipelines or the one or more new graphic pipelines are associated with a host OS of the computer system.

In accordance with an embodiment of the invention there is provided a non-transitory storage medium storing executable instructions for execution by a microprocessor, the executable instructions comprising:
   an emulation key relating to a graphic pipeline for an application executing within a virtual machine associated with a guest operating system (OS) upon a computer system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
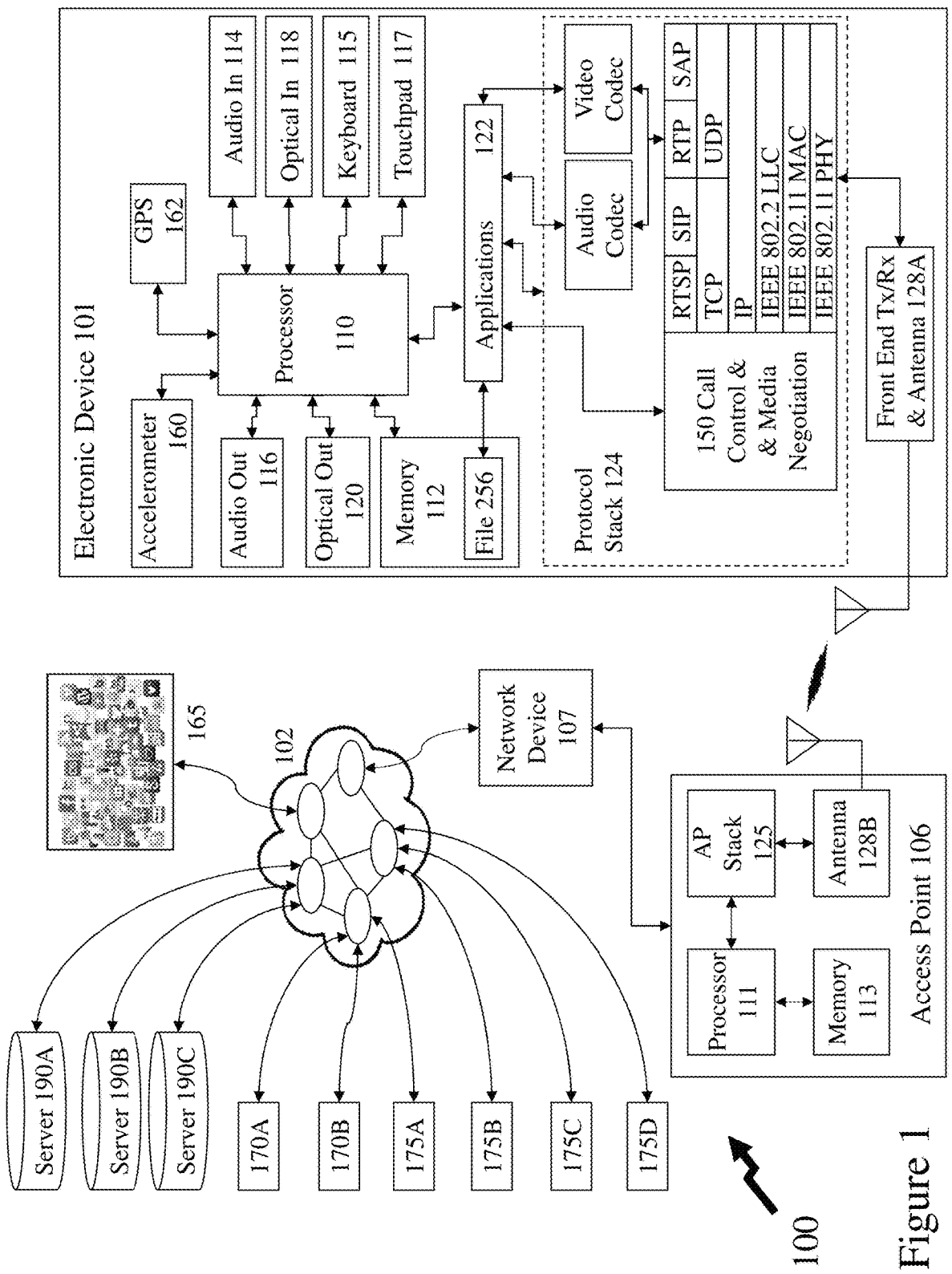
FIG. 1 depicts an exemplary electronic device and network supporting embodiments of the invention.

The present description is directed to graphics pipelines and more specifically to the emulation of one graphics pipeline within another graphics pipeline to support either features of the graphics pipeline not supported by the other graphics pipeline or address issues with respect to employing the emulated graphics pipeline within the other graphics pipeline.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can directly access a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited, to a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

An "artificial intelligence system" (referred to hereafter as artificial intelligence, AI) "as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A central processing unit (CPU), also called a central processor or main processor, as used herein, and throughout this disclosure, refers to the electronic circuitry within a computer that carries out the instructions of a computer program, such as an operating system or a software application for example, by performing the basic arithmetic, logic, controlling, and input/output (I/O) operations etc. specified by the instructions.

A graphics processing unit (GPU) as used herein, and throughout this disclosure, refers to a physical electronic circuit, physical processing unit, or virtual graphics processing unit designed to rapidly manipulate and alter memory to accelerate the processing, manipulation, creation and rendering of images in a frame buffer intended for output to a display device. A GPU typically employs a highly parallel structure than a general-purpose CPU for algorithms that process large blocks of data in parallel. A GPU may be implemented physically, for example, as a circuit upon a video card, embedded on a motherboard of a PED, FED, wearable device etc., or be embedded on the same die of as a CPU.

A virtual graphics processing unit (vGPU) as used herein, and throughout this disclosure, refers to a computer processor that renders graphics on a virtual machine's (VM's) host server rather than on a physical endpoint device such as a PED, FED, wearable device etc.

"Direct3D™ 11", "Direct3D™ 12" etc. as used herein, also referred to as DirectX graphics APIs forming part of DirectX, as used herein, and throughout this disclosure, refers to one or more application programming interfaces (APIs) for handling one or more tasks related to multimedia, for example graphics, game programming and video, on Microsoft™ platforms. Direct3D™ as used herein is a trademark of Microsoft Corporation.

"Metal™" API as used herein, and throughout this disclosure, refers to a hardware-accelerated 3D graphic and compute shader API developed by Apple™. Metal™ as used herein is a trademark of Apple Inc.

A "graphics pipeline", also known as a rendering pipeline or computer graphics pipeline, as used herein, and throughout this disclosure, refers to a conceptual model that describes the steps a graphics system needs to perform in order to render a three-dimensional (3D) scene as a two-dimensional (2D) screen, namely, to render a 3D model in a manner allowing it to be, typically, rendered or displayed upon a 2D display. Once a 3D model has been created, for instance in a video game or any other 3D computer animation, the graphics pipeline is the process of turning that 3D model into what the computer displays. As the steps required for this operation depend on the software and hardware used and the desired display characteristics, there is no universal graphics pipeline suitable for all cases. However, graphics application programming interfaces (APIs), such as Direct3D™, Metal™, and OpenGL™ for example, allow for unification of similar steps and to control the graphics pipeline of a given hardware accelerator. These APIs abstract the underlying hardware such that a software programmer does not have to generate software code in order to manipulate the graphics accelerator, generally a graphics hardware accelerator(s). The model of the graphics pipeline is typically usually used in real-time rendering. Pipeline steps may be implemented in hardware or software or a combination thereof wherein each individually and the mix thereof allows for special optimizations. The term "pipeline" is used in a similar sense to the pipeline in processors: the individual steps of the pipeline run parallel but are blocked until the slowest step has been completed.

A "hardware accelerator" as used herein, and throughout this disclosure refers to computer hardware specially implemented to perform one or more functions more efficiently than possible in software running on a general-purpose CPU. A graphics processing unit being an example of a hardware accelerator.

An "index buffer" as used herein, and throughout this disclosure, refers to a buffer employed within a pipeline wherein instead of submitting vertices to the pipeline directly, the index buffer is used. Each index (unless it is primitive restart) points to the actual vertex that is to be submitted.

A "vertex shader", also known as a shader, as used herein, and throughout this disclosure, refers to a type of computer program which is intended for shading but can also perform a variety of specialized functions including graphics special effects, video post-processing unrelated to shading, or functions unrelated to graphics processing at all. A vertex shader will read data from an input assembler stage, process it, and transfer the processed data to the next stage in a graphics pipeline.

A "tessellator" as used herein, and throughout this disclosure, refers to a stage within a graphics pipeline or display pipeline which implements a process of tessellation in order to manage one or more datasets of polygons (also referred to as vertex sets) representing objects in a scene and divides them into suitable structures for rendering. Tessellation represents tiling of a plane using one or more geometric shapes, called tiles, with no overlaps and no gaps. Typically, a tessellator employs triangles as the geometric shape with the tessellation of the patch established in dependence upon one or more tessellation parameters, such as TessFactor for example, which controls the degree of fineness of the mesh.

A "shader" as used herein, and throughout this disclosure, refers to a software program or software application, typically simple but may be complex, which describes the traits of either a vertex or a pixel.

A "hull shader" as used herein, and throughout this disclosure, refers to a stage within a sequence of stages which implement tessellation. Output(s) from a hull shader drive a tessellator stage as well as a domain shader state. A hull shader transforms a set of input control points (from a vertex shader) into a set of output control points. The number of input and output points can vary in contents and number depending on the transform (a typical transformation would be a basis transformation).

A "domain shader" as used herein, and throughout this disclosure, refers to a stage within a sequence of stages which implement tessellation. The inputs for the domain-shader stage typically come from a hull shader together with tessellator (e.g. UV) coordinates from a tessellator. A domain shader transforms surface geometry (created by a tessellator stage such as a fixed-function tessellator stage) using hull shader output-control points, hull shader output patch-constant data, and a single set of tessellator coordinates, e.g. UV coordinates.

A "geometry shader" as used herein, and throughout this disclosure, refers to a type of shader which can generate new graphics primitives, such as points, lines, and triangles, from those primitives that were sent to the beginning of a graphics pipeline. Typically, a geometry shader is executed after a vertex shader which takes as input a whole primitive, possibly with adjacency information, although it can also be executed after a domain shader. The output of a geometry output is typically zero or more primitives, which may be rasterized although the output primitives may be sent to a stream output stage, and their fragments ultimately passed to a pixel shader, for example. Typically, a geometry shader takes a primitive (or basically its number and all its vertices) as an input and outputs a variable (but always limited) number of other primitives, possibly of other type. These primitives are submitted to the rasterizer as well as to a stream output stage. Typically, a geometry shader can generate triangle strip, line strip or points. For example, Direct3D™ 11 pipeline may have up to 4 streams. This stream data can be written to the stream output buffer and one stream can be sent for rasterization.

A "pixel shader", also known as a fragment shader, as used herein, and throughout this disclosure, refers to a stage within a graphics pipeline which computes color and other attributes of each "fragment" (a unit of rendering work affecting at most a single output pixel). A pixel shader may, for example, output one screen pixel as a color value whilst more complex shaders allow for multiple inputs/outputs. A pixel shader may provide one or more functions including, but not limited to, always outputting the same color, applying a lighting value, performing bump mapping, generating shadows, generating specular highlights, providing translucency and other phenomena. A pixel shader may alter the depth of the fragment (for Z-buffering) or output more than one color if multiple render targets are active. Within three-dimensional (3D) graphics processing pipelines a pixel shader alone cannot generally produce some complex effects as it operates only on a single fragment, without knowledge of a scene's geometry (i.e. vertex data). Pixel shaders may also be applied in intermediate stages to any two-dimensional images, e.g. sprites or textures, in the pipeline, whereas vertex shaders always require a 3D scene. Typically, a pixel shader is the only kind of shader that can act as a postprocessor or filter for a video stream after it has been rasterized.

A "rasterizer" as used herein, and throughout this disclosure, refers to a stage within a graphics pipeline or display pipeline which implements a step of rasterisation (or rasterization) which takes an image described in a vector graphics format (e.g. shapes) and converts it into a raster image (a series of pixels, dots or lines, which, when displayed together, create the image which was represented via shapes). The rasterized image may then be displayed on a computer display, video display or printer, or stored in a bitmap file format. Rasterisation may refer to either the conversion of models into raster files, or the conversion of 2D rendering primitives such as polygons or line segments into a rasterized format.

An "output merger stage" as used herein, and throughout this disclosure, refers to a stage of generating the final output (e.g. pixel colour) using a combination of the pipeline state, pixel shader values from pixel shader(s), contents of render targets and the contents of depth/stencil buffers. Accordingly, the output merger stage combines the output of the rasterizer/fragment shader stages with the existing contents of a given render target or framebuffer to generate a final pipeline result (e.g., completed frame).

An "Application Programming Interface" (API) as used herein, and throughout this disclosure, refers to a set of subroutine definitions, communication protocols, and tools for building software. In general terms, it is a set of clearly defined methods of communication among various components. Exemplary APIs may be for a web-based system, an operating system, a database system, computer hardware, or a software library for example. An API specification may include, but not be limited to, specifications for routines, data structures, object classes, variables, or remote calls.

"Stream output" as used herein, and throughout this disclosure, refers to an output of primitive data which can be output to a separate buffer. This may, for example, be performed by the last active shader preceding the rasterization stage. Within this disclosure it is assumed that the data is output from the geometry stage, as it is the most general case. However, the data may be output from another stage without departing from the scope of the invention. The output data is ordered as if each input primitive was processed sequentially one by one, and each output primitive (or its part specified for output) is appended to the buffer. The amount of data output from each geometry shader instance may be different, so the space for each instance cannot be allocated before the geometry stage is run.

A "compute shader", "compute kernel" or "kernel" as used herein, and throughout this disclosure, refers to a software routine compiled for execution by a high throughput accelerator, such as a GPU, digital signal processor (DSP) or field-programmable gate array (FPGA), which is separate from but used by a main software routine or program, which is typically running on a CPU. A kernel may also be referred to as a compute shader sharing execution units with vertex shaders and pixel shaders on GPUs but may not be limited to execution upon one class of device, e.g. GPU, or API, e.g. a graphics API.

"Parallels Desktop" as used herein, and throughout this disclosure, refers to software providing hardware virtualization using hypervisor technology. Examples, may include, but not be limited "Parallels Desktop for Mac" and "Parallels Desktop for Mac Pro" for installation upon Apple® Macintosh (Mac) and Apple® Mac Pro computers allowing them to run Microsoft® Windows® applications upon Apple® Mac computers, and "Parallels Desktop for Chrome" allowing computers executing the Google® Chrome operating system (OS) to run Microsoft® Windows applications.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 120, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED. FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Figure 2:
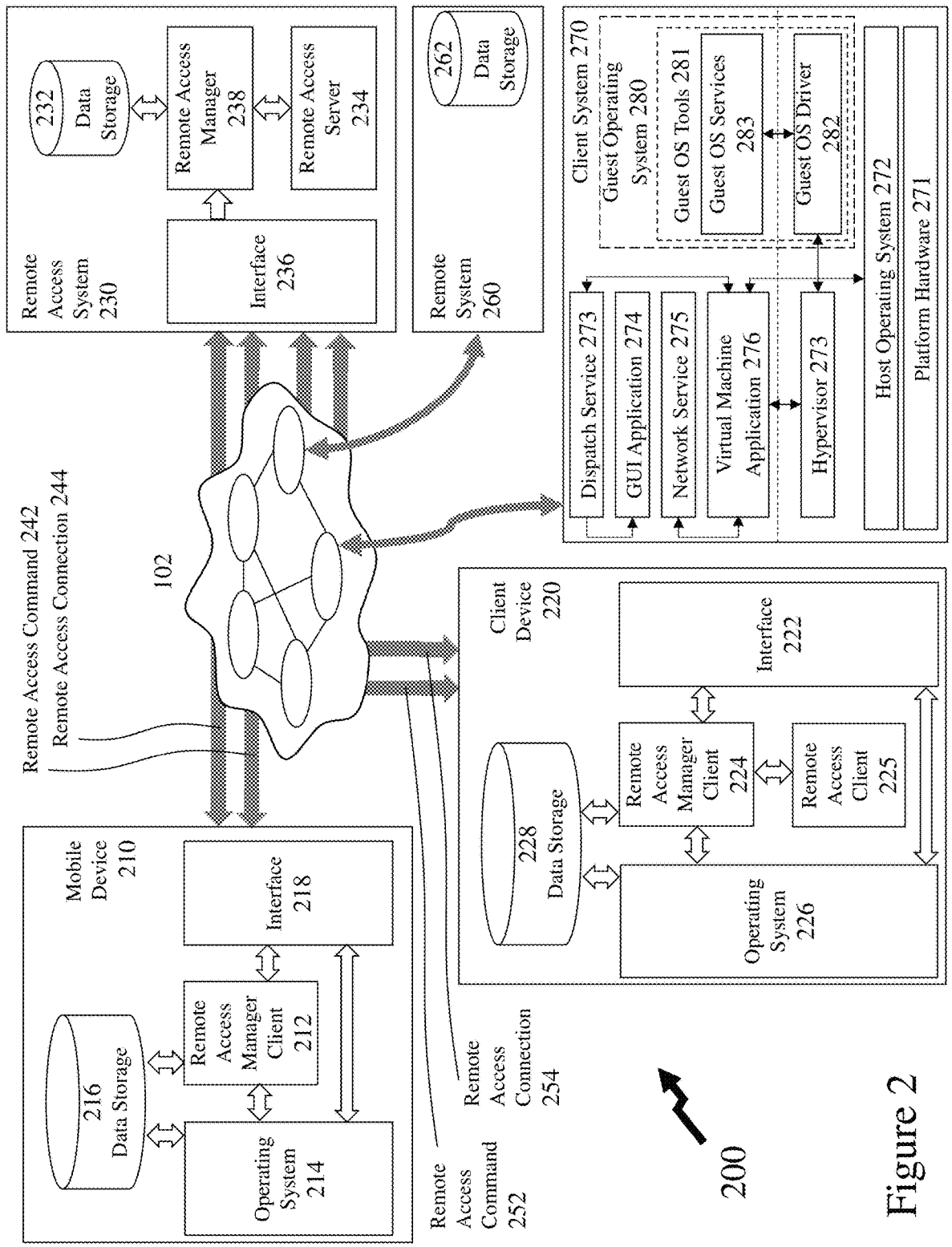
FIG. 2 depicts an exemplary block diagram of systems for virtual machines and/or remote sessions between a mobile client and/or a client device and a remote access system or a client system and remote system as supported by embodiments of the invention.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figures 3A, 3B:
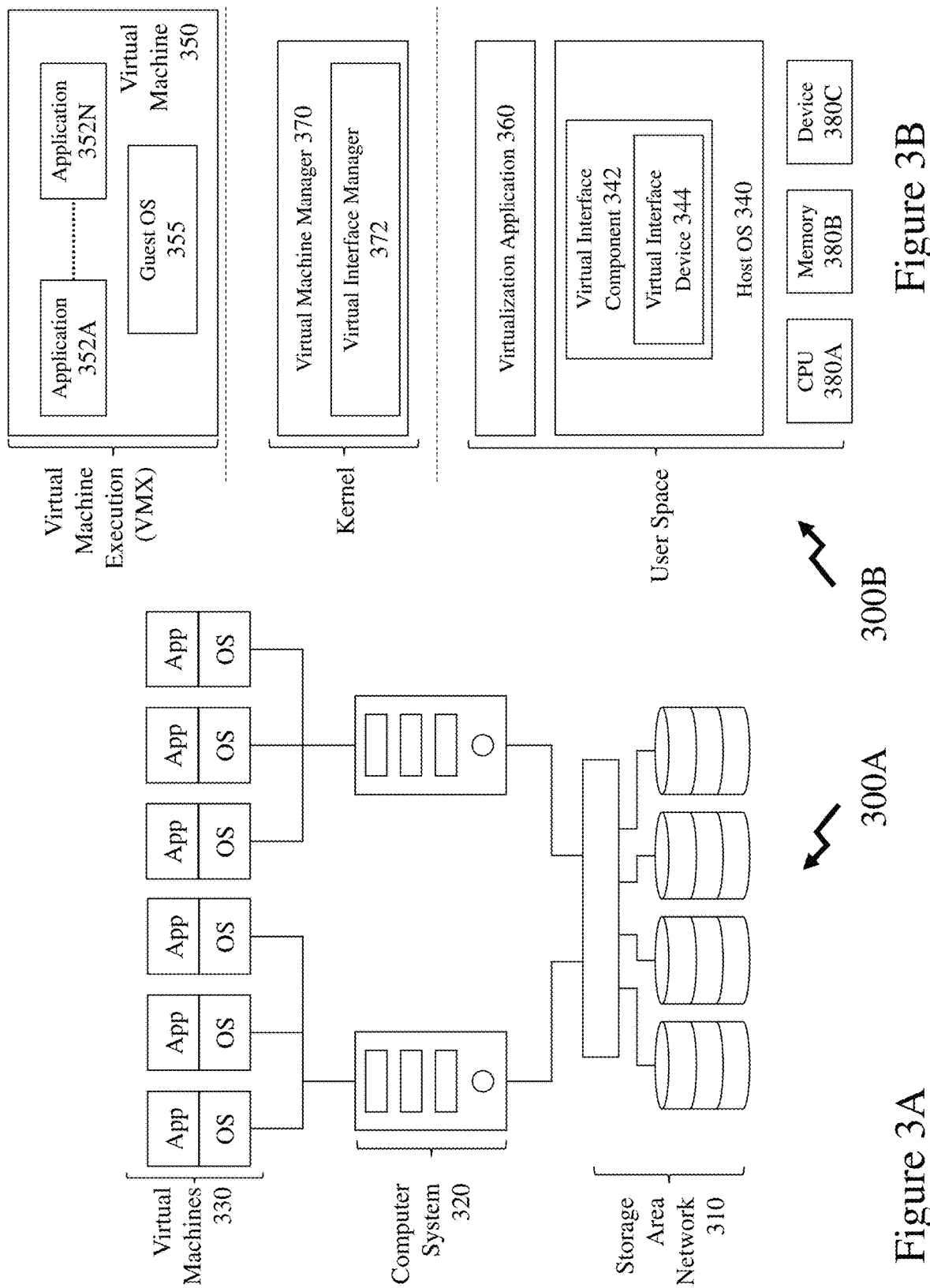
FIG. 3A depicts schematically an architecture of virtual machines as instantiated by remote access sessions supporting embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B.

One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Also depicted with respect to schematic diagram 200 in FIG. 2 are a Remote System 260 and Client System 270. The Client System 270 supporting virtual machine software, such as Parallels® Desktop for example, for running software of one operating system (Guest Operating System 280), upon the Client System 270 which employs another operating system (Host Operating System 272) upon Platform Hardware 271 of the Client System 270. Accordingly, installed upon the Client System 270 is a hardware emulation virtualization software that uses hypervisor technology to run an unmodified copy of the Guest Operating System (Guest OS) 280, e.g. designed for an Intel-compatible CPU (e.g., Windows), side by side with the Host Operating System (Host OS) 272 (e.g. Apple® OS X). The Guest OS 280 executes inside a virtual machine by means of the Hypervisor 273, e.g. Parallels® Hypervisor, that works by mapping the Client System 270 hardware resources, e.g. an Apple® Mac computer, directly to the virtual machine's resources. The Hypervisor 273 leveraging features of a hardware virtualization assistance embedded within an Intel CPU, e.g. VT-x, EPT, etc. Each virtual machine (VM) established operating identically to a stand-alone computer, with virtually all the resources of the physical computer, Client System 270. In this manner the VM is able to virtualize a full set of standard PC hardware upon a non-PC platform.

As depicted the VM software installed upon the Client System 270 comprises the Hypervisor 273, a VM Application 276, Guest OS Tools 281, a Dispatch Service 273, a GUI Application 274, and a Network Service 274. The Guest OS Tools 281 being executed within the VM upon the Guest OS 280.

The Hypervisor 273 provides a host kernel module employed to create and execute VMs. The Hypervisor 273 mapping the Client System 270 hardware resources directly to the VM's resources. By using CPU virtualization hardware support, the Hypervisor 273 traps and emulates Guest OS 280 access to the Client System hardware (e.g. Platform Hardware 271 elements such as CPU, timer, interrupt controller, network, disk, sound, etc.), and intercepts and processes some CPU instructions and memory access faults originating within the VM. By leveraging Extended Page Tables (EPT), the Hypervisor 273 controls attempts of the Guest OS 280 to access the physical memory of Client System 270, preventing the Guest OS 280 from accessing arbitrary physical memory pages besides those allocated for it by the Hypervisor 273. In this manner the Hypervisor 273 ensures that the Guest OS 280 executes isolated from the Host OS 272 and does not access an arbitrary memory location or executes unsafe CPU instructions outside the VM that could result in unauthorized access or disruption of host data and/or disordering a normal behavior of the Host OS 272.

The Virtual Machine Application 276 communicates with the Hypervisor 273 and Host OS 272 in order to perform several functions including, loading a VM into the memory with the help of Hypervisor 273; managing the lifecycle of the executed VM and its states (e.g., start/stop/pause/restart/shutdown VM, create a snapshot, revert to snapshot, etc.), emulating VM devices (e.g. CPU, timer, interrupt controller, network, disk, sound, etc.), and processing requests for execution of operations on virtual devices signaled by the VM through the Hypervisor 273 and mapping results back to the VM via the Hypervisor 273.

A VM Application 276 may be started by the Host OS 272 and run as a regular process such that it falls under all the regular process restrictions like virtual memory space isolation, file permissions etc., as with any other system process.

The VM Application 276 is the only process that communicates with the Guest OS 280 that runs inside the VM, through the hypervisor API. Operations inside the VM requiring access to a real device are redirected by the Hypervisor 273 to the VM application in the Host OS 272 which is then emulated by the VM Application 276.

Typically, when executing device commands translated from the VM by the Hypervisor 273, the VM Application 276 accesses only a limited set of Host OS 272 files which emulate virtual devices included in the VM configuration, e.g., virtual hard disks image files; such that it does not enable the Guest OS 280 to access arbitrary Host OS 272 files. The VM Application 276 emulates operations on virtual devices requested by the Guest OS 280, in a user mode context such that the Guest OS 280 does not have access to the host kernel and/or any other system process/file or their memory in Host OS 272 directly through virtual devices.

Guest OS Tools 281 provides a suite of special utilities that enable tight integration between the Host OS 272 and the Guest OS 280 such that the user can access and exploit the VM(s) in a comfortable and efficient manner. One such aspect being sharing files and applications allowing users to easily access their Host OS 272 files using Guest OS programs, and also to access Guest OS 280 files using Host OS 272 applications. Optionally, documents from both Host OS 272 and Guest OS 280 may be stored within the same folder. As depicted the Guest OS Tools 281 comprises a Guest OS Services 283 element and one or more Guest OS Drivers 282.

Dispatch Service 273 provides a management component of the VM software which is responsible for managing a VM directory (registering/unregistering VMs), creating the VM's resources (e.g. configuration files, hard disk image files, etc.) in the Host OS 272 file system, committing changes in VM configuration files as requested, processing commands and events that help manage a VM lifecycle, received from the GUI Application 274 and the VM Application 276, providing a communication channel between the VM application and the GUI application, and enabling the exchange of data (e.g. commands, keyboard, and mouse input data travel from the GUI Application 274 to the VM Application 276 and events from the VM Application 276 back to the GUI Application 274.

Optionally, the Dispatch Service 273 runs as a system service (daemon) with root privileges communicating with the GUI Application 274 and VM Application 276 through a Unix domain (IPC) socket, for example. The Dispatch Service 273 also facilitates a direct connection between the GUI Application 274 and the VM Application 276 through this socket whilst utilization of the Unix domain socket makes communications secure as this kind of socket exists only inside a single computer. Accordingly, the Dispatch Service 273 communications cannot be eavesdropped on by an untrusted network, and remote computers cannot connect to it without some sort of forwarding mechanism. Typically, the Dispatch Service 273 is designed to process only a limited set of commands from the GUI application, commands that target management of a VM directory and individual VMs.

The Network Service 275 enables various types of networking to VMs such as a Shared Network, wherein the Guest OS 280 shares a network connection with the Host OS 272 such that the Guest OS 280 and Host OS 272 appear as a single entity in the external network, a bridged network wherein the Guest OS 280 can use one of the Client System 270 network adapters such that the Guest OS 280 appears as a separate computer on the network, and a host only network, where the Guest OS 280 cannot access any external networks, only the Client System 272.

The GUI Application 274 provides a GUI through which a user creates a VM, manages its state (start/stop/pause/resume/shutdown, etc.), and operates with the Guest OS 280 virtual display that shows the user interface of the Guest OS 280. A GUI Application 274 may run as a regular Host OS 272 process with the privileges of the current user and establishes a connection to the Dispatch Service 273 using the Unix domain socket, through which it sends commands and receives events that enable managing within, to and from a VM. It also establishes, in conjunction with Dispatch Service 273, a direct connection via a Unix domain socket to the VM application process, through which it transmits keyboard and mouse input to the VM. In some instances regardless of a VM view mode of the GUI Application 274, the Guest OS 280 and its applications remain running in an isolated VM environment controlled by the Hypervisor 273. Generally, the GUI Application 274 does not communicate directly with the Guest OS 280 and does not access any guest OS data directly, except the shared video memory buffer. It is further typically not designed to accept and execute commands from a VM application and/or the Guest OS 280.

As depicted in FIG. 2 the Client System 270 may communicate with a Remote System 260 via the Network 102. The Remote System 260 comprising at least a Data Storage 262. Remote System 260 may be discrete from Remote Access System 230 or it may form part of an overall remote service in conjunction with the Remote Access System 230. Accordingly, executing an application upon the Client System 270 communications are established with the Remote System 260 such that, for example, a trial license key for the Client System 270 may be requested, the user and/or Client System 270 registered with the Remote System 270 to execute the VM software upon the Client System 270, periodically validate a license key and update a license key, check/download software updates, report problems, access electronic content stored within the Data Storage 262, access complimentary products etc.

Client System 270 may also support similar software and functionality as Client Device 220 and/or Mobile Device 210 allowing it support both VMs directly established upon itself or VMs indirectly established upon Remote Access System 230.

Referring to FIG. 3A there is depicted a schematic architecture 300A supporting embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux™, Windows™, Android™, and iOS™, for example, which may be the same as or different to the operating system of the user's device, e.g. Mobile Device 210 or Client Device 220.

Within applications ranging from medical imaging, through computer aided design, modelling, simulation, to graphics and video games there exists the requirement to convert three dimensional (3D) data representing the environment within the application to two dimensional (2D) data so that it can be rendered upon a display to a user or users. Accordingly, a computer graphics pipeline, rendering pipeline or simply graphics pipeline, is a conceptual model that describes the steps that a graphics system needs to perform to render a 3D scene as a 2D image so that it can be displayed upon a screen or stored in a graphic image file format. Once a 3D model has been created, for instance in a video game or computer animation, the graphics pipeline is the process of turning that 3D model into the 2D data displayed to a user or stored within an image data file for subsequent printing, rendering etc.

Graphics pipelines are designed for execution by a host (or native) operating system. Accordingly, commercially there are multiple 3D graphics Application Programming Interfaces (APIs) including, but not limited to, APIs for Microsoft™ Windows such as Direct3D™ 11 and the lower overhead Direct 3D 12 from Microsoft™; low overhead cross-platform APIs such as Vulkan™ from Khronos Group; and low-level, low overhead hardware accelerated APIs such as Metal™ from Apple™ for iOS™, macOS™ and tvOS™ applications.

Accordingly, whilst Metal™ allows graphics applications and compute applications to be written in a single unified language allowing increased integration between these applications it is intended to operate upon Apple™ operating systems (OSs). Similarly, Direct 3D 11 for example is a graphics API for the Microsoft™ Windows OS intended for applications where performance is important such as gaming for example, allowing use of hardware acceleration where it is available.

Hence, providing support for multiple operating systems such as Apple™ iOS and Microsoft™ Windows requires exploitation of both Metal™ for the former and Direct3D™ for the latter. However, it is common that the features of one API are not implemented or supported within another API. For example, when considering the Metal™ tessellation pipeline there are several features of Direct3D™ which it does not implement so that it is not possible to use the Metal™ tessellation pipeline to implement all Direct3D™ graphics pipelines with tessellation. Accordingly, the inventors within U.S. patent application Ser. No. 16/800,656 entitled "Hardware Assisted Emulation of Graphics Pipeline" filed Feb. 25, 2020, the entire content of which are incorporated herein by reference, emulated a tessellation API, such as the Direct 3D 11 tessellation pipeline, upon a graphical processing unit (GPU) so that the tessellation pipeline is accessible to another graphics pipeline API, e.g. Metal™. As this emulation exploited a GPU then it is referred by the inventors as hardware accelerated.

Figure 4:
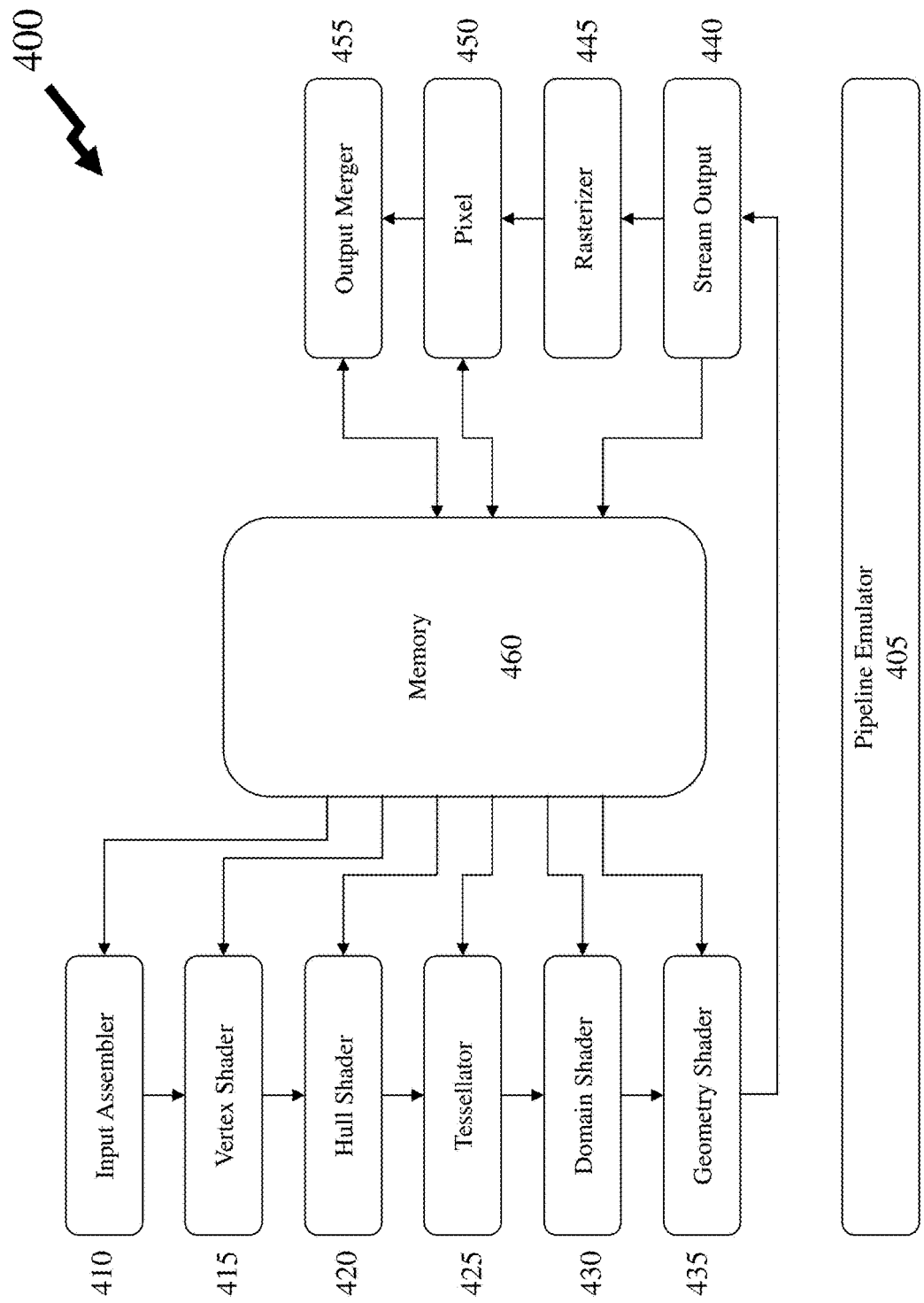
FIG. 4 depicts an emulation pipeline as supported by embodiments of the invention.

Referring to FIG. 4 there is depicted an exemplary graphics pipeline for cross-platform emulation in accordance with embodiments of the invention. As schematically illustrated in FIG. 4 the Emulated Graphics Pipeline 400 which is fed into a Graphics Pipeline Emulator 405 comprises first to tenth elements 410 to 455 respectively, these comprising First element 410, an input assembler;
Second element 415, a vertex shader;
Third element 420, a hull shader;
Fourth element 425, a tessellator;
Fifth element 430, a domain shader;
Sixth element 435, a geometry shader;
Seventh element 440, a stream output;
Eighth element 445, a rasterizer;
Ninth element 450, a pixel shader; and
Tenth element 455, an output merger stage.

As depicted first to ten elements 410 to 455 are coupled to Memory 460 to either receive data from the Memory 460 and/or provide data to the Memory 460.

Within the following description(s) embodiments of the invention will be described and depicted from the perspective of emulating Direct3D™ graphics pipelines within virtualization software such as Parallels Desktop allowing the Direct3D™ graphics pipeline for Microsoft® Windows applications to be emulated upon computers executing an Apple® operating system. However, it would be evident that the methodologies, processes and systems described and depicted may be applied to other emulations of graphic pipelines of one operating system and/or hardware configuration upon another operating system and/or hardware configuration. An operating system exploiting embodiments of the invention may be a specific release, multiple releases, etc.

As discussed within "Hardware Assisted Emulation of Graphics Pipeline" differences between the Direct3D™ Version 11 (hereinafter "Direct3D™ 11") graphics pipeline and Metal™ graphics pipeline were addressed through hardware emulation. The Direct3D™ 11 pipeline, which includes a vertex shader, a hull shader, a domain shader, a geometry shader and a pixel shader, being referred to as a "standard" pipeline. Most graphics APIs employ this standard pipeline such as Direct3D™ 11, Direct3D™ 12, OpenGL™ 4.0+, Vulkan™. Direct3D™ 12 provides a lower level of hardware abstraction than Direct3D™ 11 and earlier versions, enabling improved multithreaded scaling and reducing CPU utilization for improved matching to the underlying hardware. New pipeline stages within Direct 3D 12 such as mesh shaders and raytracing are not considered at this point such that a pipeline emulation of Direct3D™ may employ already implemented algorithms for Direct3D™ 11. However, unlike Metal™ where all parameters for generating the pipelines are known from a single draw call, these parameters are not known within Direct3D™ 11 pipelines and accordingly obtaining this information requires additional processing which can affect performance of the overall system implementing the pipeline(s) unless specific steps and measures are performed.

The inventors refer to this as the "first draw call" problem wherein if the process establishes that it does not have any cached Metal™ pipelines then it needs to generate new Metal™ pipelines. An exemplary example of this being when a game, for example, renders for the first time wherein there are periods of apparently inactivity, commonly referred to as freezes, which can last several seconds; as a result of the need to generate these pipelines. After some period of time, all pipelines required for rendering the current frame are created and the game proceeds (working normally). However, if a change within the game occurs, e.g. rotation of the player results in rotation of a "camera" which renders the user's view, then new objects may be within the new field of view which employ new shaders for rendering, and for which, therefore, new Metal™ pipelines must be generated. The result is that the game provides the user with what they perceive as poor performance. However, the inventors have established, that in contrast to this drawback being present with emulating Direct3D™ releases 9 through 11 without solution, there are elements of the Direct3D™ 12 API which through embodiments of the invention can be exploited to address this problem.

Prior to addressing these methodologies, solutions and systems according to embodiments of the invention a brief overview of rendering with respect to the Direct3D™ 11, Direct3D™ 12 and Metal™ graphics pipelines.

Referring initially to the Metal™ pipeline, then within Metal™ the application must compile the multiple shaders, e.g. vertex shader and fragment shader for a graphics Pipeline State Object (PSO) or a compute shader for a compute PSO, from source code and create the Pipeline State Objects (PSOs) that contains the shaders and their associated pipeline parameters. However, these operations are computationally expensive and, accordingly, it is recommended that all PSOs are created during game loading such that once the application is executing the delays and overhead of creating additional PSOs are avoided. However, the specifics of emulating Direct3D™, prevent this as outlined below.

Now considering a Direct3D™Direct3D™ 11 pipeline then there is no such thing as a PSO. However, there are shader objects with applications, e.g. games, creating shaders during game loading wherein once they are created, the application establishes a context to these shaders and employs them. However, an emulator cannot generate anything by using these shaders as it does not have all the information required to do so, i.e. all pipeline shaders, pipeline state and information about resources.

However, Direct3D™ 12 whilst it now includes PSOs does so in a manner with small differences to PSOs within Metal™ as will become evident in the following description. Accordingly, where a game creates all the required pipelines during loading then in principle the emulator can create all the required Metal™ PSOs needed during the step of Direct3D™ 12 PSO creation. However, there are several issues with implementing this methodology and accordingly the inventors have established embodiments of the invention to address these and overcome them., we can solve problem described above (as we create all Metal™ PSO during game loading). However, there are several problems with implementing this scheme. Patent describes how we can solve them.

In order to generate a Metal™ pipeline PSO the following information is required:

Compiled vertex and fragment functions;
Pixel format of color and depth buffers;
Write masks of color buffers;
Blending information (e.g. blending rate "alpha");
Rasterizer input primitive topology class (e.g. point, line, triangle);
Sample count;
Tessellation information (if a tessellation graphics pipeline is employed); and
Vertex declarations such as:
  Formats, buffer slots and offsets of attributes; and
  Step rate, step function and stride of buffer streams.

In contrast, in order to generate a Direct3D™ 12 pipeline PSO the following information is required:

Compiled vertex, hull, domain, geometry and pixel shaders (only vertex shader is required);
Root signature (additional information about resources used within the pipeline);
Stream output descriptor;
Blending descriptor;
Sample mask (a feature absent in Metal™, implemented by the inventors within their methodologies);
Rasterizer descriptor (e.g. fill mode, cull information, depth bias etc.)
Depth/stencil descriptor (in Metal™, depth/stencil objects are separate from their respective PSO);
Input layout comprising attribute information such as formats, buffer slots, offsets, input slot class (step function), instance data step rate, etc.;
Index buffer cut value (for primitive restart);
Primitive topology type (similar to rasterizer input primitive topology class);
Pixel format of color and depth buffers; and
Sample count.

Figure 5:
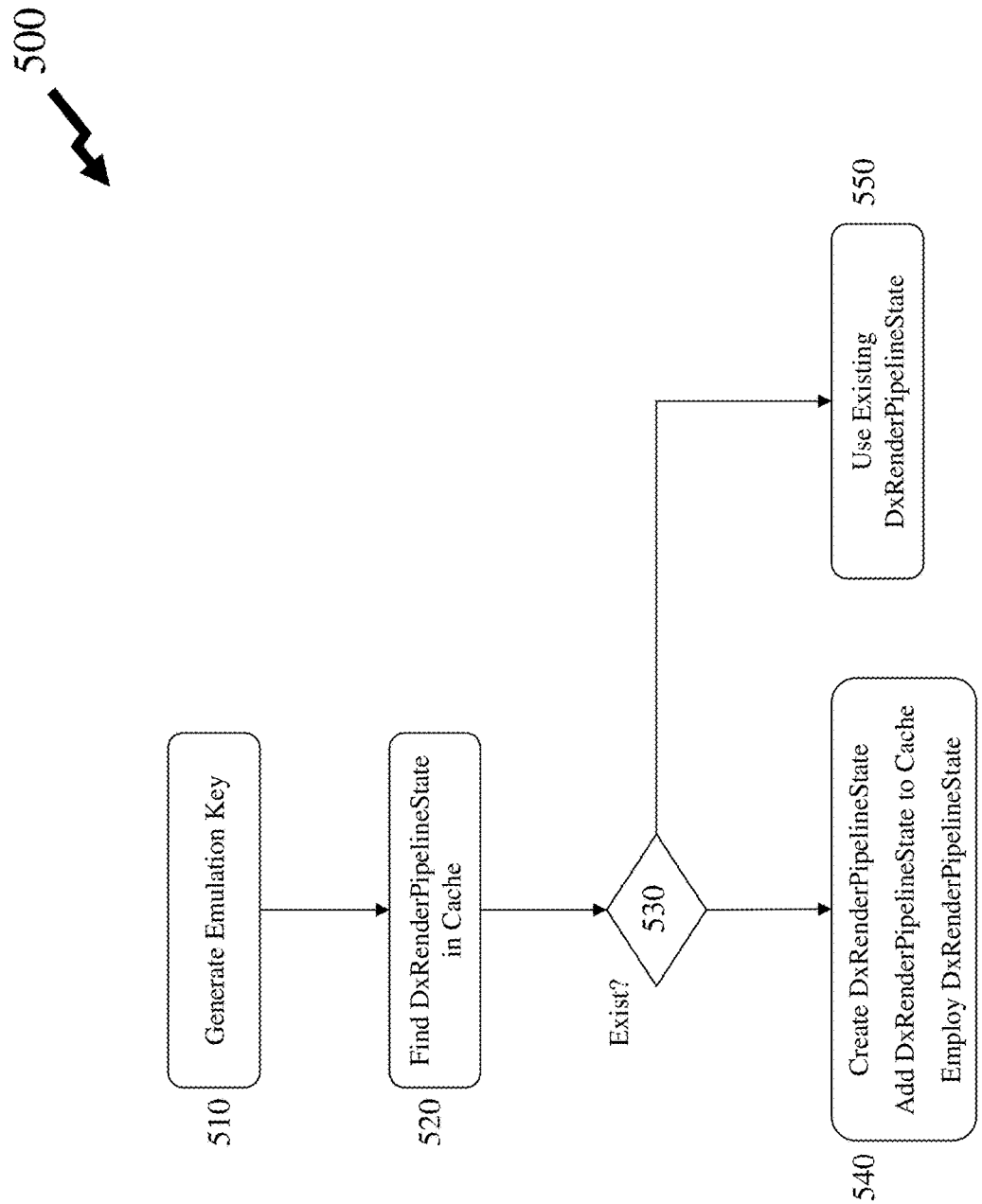
FIG. 5 depicts an exemplary process flow according to an embodiment of the invention with respect to identification of an emulation pipeline object, DxRenderPipelineState.

Accordingly, whilst there are several similarities between the Metal™ and Direct3D™ 12 pipeline descriptors there are also some significant differences. Accordingly, a Direct3D™ standard pipeline emulation requires several Metal™ pipelines (graphics or compute). These pipelines are placed within a DxRenderPipelineState object. Accordingly, embodiments of the invention prior to performing a draw call establish whether a cached DxRenderPipelineState object exists or create new one. Accordingly, the emulation layer implemented by the inventors within embodiments of the inventor maintains a cache. Accordingly, in order to find an object within cache the emulator is required to pass one or more shader handles (i.e. the unique identifier(s) of the shader(s)) and a key which contain information relating to which emulations are used within the Metal™ pipeline generation process. Accordingly, referring to FIG. 5 this process is depicted at a high level. Such an algorithm being employed within Direct3D™ 11 wherein all pipelines are creating synchronously, leading to the so-called "first draw call" problem.

As such Flow 500 comprises first to fifth steps 510 to 550 respectively, these comprising:

First step 510 wherein the Emulation Key is created;
Second step 520 wherein the cache is searched to determine whether the DxRenderPipelineState exists within the state;
Third step 530 wherein a determination of the result second step 520 is made wherein upon a positive determination the process proceeds to fifth step 550 otherwise it proceeds to fourth step 540;
Fourth step 540 wherein it has been established that DxRenderPipelineState object does not exist in cache and accordingly the Flow 500 creates a new DxRenderPipelineState object, adds the DxRenderPipelineState state to cache, and uses the new DxRenderPipelineState state; and
Fifth step 550 wherein it is established that the DxRenderPipelineState object does exist within the cache and the emulation proceeds to employ it.

Figure 6:
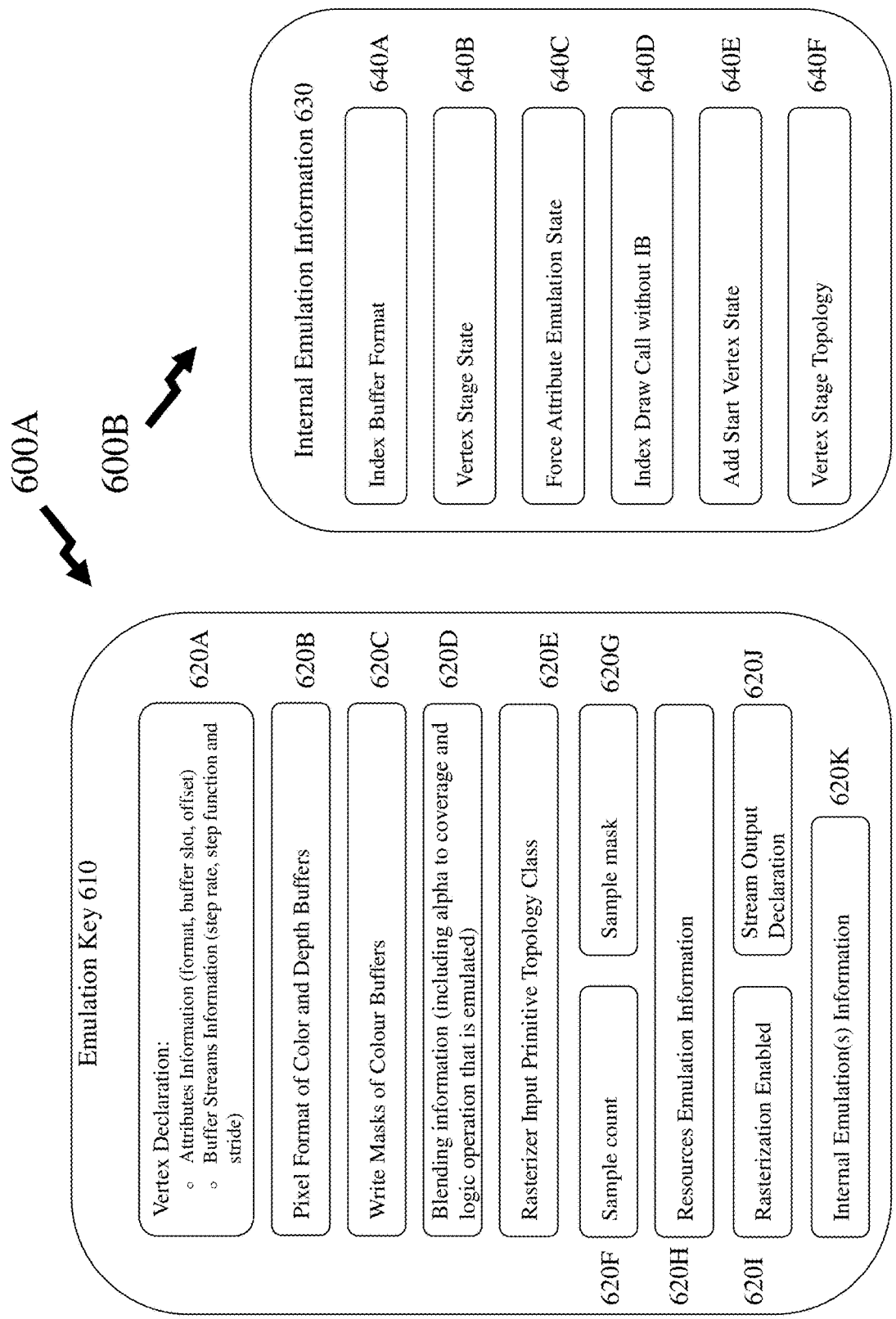
FIG. 6 depicts an exemplary structure of an emulation key employed within embodiments of the invention to find an emulation pipeline object, DxRenderPipelineState, within cache memory in conjunction with one or more unique identifiers of shaders associated with the emulation pipeline.

Accordingly, referring to FIG. 6 there is depicted an exemplary structure of an Emulation Key 610 as employed within embodiments of the invention to find an emulation pipeline object, DxRenderPipelineState, within cache memory in conjunction with one or more unique identifiers of shaders associated with the emulation pipeline, for Direct3D™ 11 pipeline, and in conjunction with a unique identifier in the instance of a Direct3D™ 12 pipeline. Accordingly, there are depicted the structure of the Emulation Key 610 in first Image 600A and the Internal Emulation Information 630 in second Image 600B. Referring initially to first Image 600A then the Emulation Key 610 is depicted as comprising first to eleventh elements 620A to 620K respectively, these being:

First element 620A comprising vertex declarations which includes, for example, attributes information (e.g. format, buffer slot, offset) and buffer streams information (e.g. step rate, step function and stride);
Second element 620B comprising pixel format of color and depth buffers;
Third element 620C comprising write masks of color buffers;
Fourth element 620D comprising blending information (including, for example, alpha factor of blending and logic operation which is emulated);
Fifth element 620E comprising the rasterizer input primitive topology class if layered rendering in enabled and geometry shader and tessellation is disabled (otherwise shaders contain information about primitives);
Sixth element 620F comprising sample count;
Seventh element 620G comprising sample mask employed;
Eighth element 620H comprising information relating to resource emulation;
Ninth element 620I which defines whether rasterization is enabled or not;
Tenth element 620J which establishes a stream output declaration; and
Eleventh element 620K which defines information relating to internal emulation(s).

Referring to second Image 600B then the Internal Emulation Information 630 is depicted as comprising first to seventh IEI elements 640A to 640G respectively, these being:

First IEI element 640A comprising index buffer format (e.g. 16-bit index buffer, 32-bit index buffer or without index buffer) and emulation type. This information is added to the Emulation Key 610 in several instances (if shaders are reading the content of one or more index buffers explicitly (it can be used to calculate primitive id for indexed draw call), or if there is a compute shader that emulates a vertex shader, a computer shader can emulate several shaders such as a vertex shader and hull shader or a vertex shader and a geometry shader for example (in which case this information must be put into the Metal™ compute pipeline descriptor);
Second IEI element 640B entitled "Vertex Stage State" defining a state entitled "vertex stage each primitive" as either true or false. This state is enabled if the emulation pipeline is required to read all vertices explicitly (disabling optimization for strip primitives). This may also be employed to correct a Primitive ID calculation for some topologies in some instances;

Third IEI element 640C entitled "Force Attribute Emulation State" defining a state entitled "Force Attribute Emulation" as either true or false. This state enables or disables reading attributes explicitly for one or more buffers within the vertex shader. This may also be employed for emulation in some instances, e.g. for adjacent topologies;

Fourth IEI element 640D entitled "Index Draw Call Without IB" defining as either true or false, in some instances, whether an indexed draw call is made without an index buffer;

Fifth IEI element 640E entitled "Add Start Vertex State" defining as true or false whether to add a start vertex on a GPU associated with the emulation; and Sixth IEI element 640F which defines the vertex stage topology if "vertex stage each primitive" state is enabled or a vertex shader is emulated within a compute stage of the emulation.

Within the Emulation Key 610 no tessellation information is added as this information is placed within the DirectX hull and domain shaders and, accordingly, it is not necessary to store this information one more time.

As discussed above embodiments of the invention address the issue of lags within graphical emulation pipelines within emulators for Direct3D™ exploiting Metal™ pipelines. As part of this a set of Metal™ pipelines (DxRenderPipelineState) are created when an application initially creates a Direct3D™ 12 PSO. However, as noted above and with respect to FIG. 6 there are differences between a Direct3D™ 12 PSO and a Metal™ PSO where there are multiple emulation parameters which cannot be calculated by the Direct3D™ 12 PSO parameters and must be provisioned through one or more additional processes. Accordingly, the information required by DxRenderPipelineState which is not contained within a Direct3D™ 12 PSO includes:

Information relating to vertex stream strides, as defined as part of first Element 620A of Emulation Key 610; and Internal Emulation Information 630 comprising first to sixth IEI elements 640 to 640F respectively.

Accordingly, within embodiments of the invention a universal DxRenderPipelineState is created, referred to as a "main" DxRenderPipelineState with estimates of these parameters which must be passed in order to emulate the Direct3D™ 12 PSO. It would be preferable if this universal or main pipeline was compatible with as large a proportion of draw calls for a given pipeline as possible to reduce, as described and depicted with respect to FIG. 7, the requirement for specific pipelines to be established either synchronously or asynchronously.

These estimates may be derived as outlined below or through other embodiments of the invention based upon one or more factors including, but not limited to, a previous call made by the application in execution for the user employing the application, previous calls made by the application in execution for the user employing the application, a previous call made by the application in a particular configuration (e.g. at the same level, entry point, stage etc. of the application) as called by multiple instances of the application by different users, and previous calls made by the application as called by multiple instances of the application by different users at the same or different configurations (e.g. (e.g. at the different levels, entry point, stage etc. of the application).

Optionally, the parameters for the main DxRenderPipelineState may be defined by the application itself. Optionally, the parameters for the main DxRenderPipelineState may be defined by the host operating system executing the emulation pipeline for the virtual machine to which the graphic pipeline relates. Optionally, the parameters for the main DxRenderPipelineState may be defined by an administrator of a computer system upon which the emulation is executed.

Optionally, the parameters for the main DxRenderPipelineState may be defined by one or more "dummy" executions of the graphical pipeline emulation performed at initial launch of the application. Optionally, the parameters for the main DxRenderPipelineState may be defined by one or more "dummy" executions of the graphical pipeline emulation performed at initial launch of a virtual machine to establish one or more parameters where the user establishing the virtual machine has previously executed the application to which the graphical emulation pipeline is associated. Optionally, these "dummy" executions may be triggered where the user previously exited or suspended a virtual machine with the application established as active within a predetermined period of time prior to exiting or suspending the virtual machine. Optionally, these "dummy" executions may be established when a probability of a user accessing the application exceeds a predetermined level based upon analysis of virtual machines established by the user. Optionally, within other embodiments of the invention the user may be replaced or augmented by an enterprise to which the user is associated, a computer system the user employs to establish the virtual machine, etc. Accordingly, a user may establish and play a game within a first virtual machine requiring the graphical pipeline emulations from a PED, for example, whilst they employ other applications and not the game within other virtual machines from a FED or wearable device, for example.

Establishing an estimate for the vertex stream stride is particularly difficult. A vertex buffer contains information relating to the vertices of points to be processed/rendered. However, in addition to vertex format information which defines how big each vertex is in bytes two other elements of information may be required, one being a byte offset from the start of the buffer to the first element in the array of points and the vertex stream stride, which defines how many bytes it is from the start of one element to the start of another. However, the byte offset may not be required within other embodiments of the invention to build the pipeline as it may be offset dynamically. Accordingly, the inventors establish the vertex stream stride by a sequence comprising:

Reading vertex buffers as standard buffers rather than as a native Metal™ vertex declaration (although this could be performed within other embodiments of the invention);

Reading the vertex streams as standard buffers;

Establishing the vertex stream stride from the standard buffers; and

Passing the vertex stream strides through a constant buffer to a subsequent shader stage.

Potentially, this additional processing reduces emulation pipeline performance but techniques to address this have been established by the inventors as discussed below.

The requirement to pass the index buffer format is also not an obvious parameter required for passing from the Direct3D™ 12 PSO to the DxRenderPipelineState PSO in Metal™. Within an embodiment of the invention the index buffer format is established in dependence upon an index buffer cut value obtained from the Direct3D™ 12 PSO descriptor. This approach provides the appropriate prediction for most instances. However, issues can arise with pipelines employing geometry shaders (although these are not commonly used now within applications) or employing tessellation (which is particularly common in gaming applications).

Accordingly, within embodiments of the invention one approach is to generate all possible Metal™ compute pipelines that emulate vertex shaders for all possible types of index buffer (e.g. 16-bit index buffer, 32-bit index buffer or without index buffer).

Alternatively, within embodiments of the invention the number of extra generated Metal™ pipelines can be reduced using the index buffer cut value information. For example, if this value is D3D12_INDEX_BUFFER_STRIP_CUT_VALUE_0xFFFF, for example, then it is assumed that the draw call(s) will user a 16-bit index buffer or that the draw call(s) are not indexed. Similarly, the index buffer can be established in dependence upon whether this value is D312_INDEX_BUFFER_STRIP_CUT_VALUE_0xFFFFFFFF, for example. However, no assumptions can be made for the index buffer if this value is D3D12_INDEX_BUFFER_STRIP_CUT_VALUE_DISABLED, for example.

However, estimates for other states can be established. Considering initially the "vertex stage each primitive" then this state is very rarely enabled. It is enabled if adjacent topology is employed, which is typically only encountered with geometry shaders and even then rarely, or there is non-indexed draw call with a strip topology, without geometry shader or tessellation, where the pixel shaders want to obtain the Primitive ID. Accordingly, for almost all pipelines this state will be disabled.

Now considering "force attribute emulation" then again an estimated typical value can be established for this state value. Accordingly, this state has a very complex enabling condition. It is therefore assumed that there will not be draw calls with adjacent topologies; for pixel shader with Primitive ID input, there will not be strip topology; it will not be an indirect call; there will be no special case when a draw call is indexed and the index buffer is absent; it is not strip topology with geometry shader; etc. Several other special cases are not listed for enabling this state. Accordingly, for almost all pipelines this state will be disabled.

Now considering the state of "indexed draw call without index buffer" ("Index Draw Call without IB", fourth IEI element 640D in Internal Emulation Information 630 of second Image 600B in FIG. 6) then the assumption is that this is false. Essentially, the number of instances where this would be true are limited, with the primary instance being during debugging, for example, within a gaming application debug to address graphics related issues. The "add vertex state" for adding the start vertex onto the GPU can also be established from a decision process when a draw call is not indirect. Further, the vertex stage topology can be established using the primitive topology type from within the Direct3D™ 12 PSO descriptor. This may lead to incorrect assumptions in limited instances such a stream output from a vertex shader or in instance of a geometry shader.

Accordingly, the inventor's novel process establishes decisions for the states required for transfer as part of the Internal Emulation Information 630 forming part of the Emulation Key 610 based upon multiple decision processes, defaults etc. during the Direct3D™ 12 PSO creation.

Whilst not described and discussed in detail here it should also be noted that the decision processes with respect to the Direct3D™ 12 PSO creation and the resulting DxRenderPipelineState PSO in Metal™ may also include decision processes with respect to the resources to be employed/accessible/available to the pipeline.

Accordingly, the inventor's novel processes and algorithms generate a "main" pipeline which can be used in draw calls. However, in some instances, this pipeline cannot be used to which is also added the issue that this "main" pipeline may be slower when the pipeline is generated during a draw call. This arises, primarily, as the vertex declaration is emulated and the vertex stream strides are parsed (read) through a constant buffer, which is slower. Further, there may also be slower, more general, shader code that works with the system resources.

Figure 7:
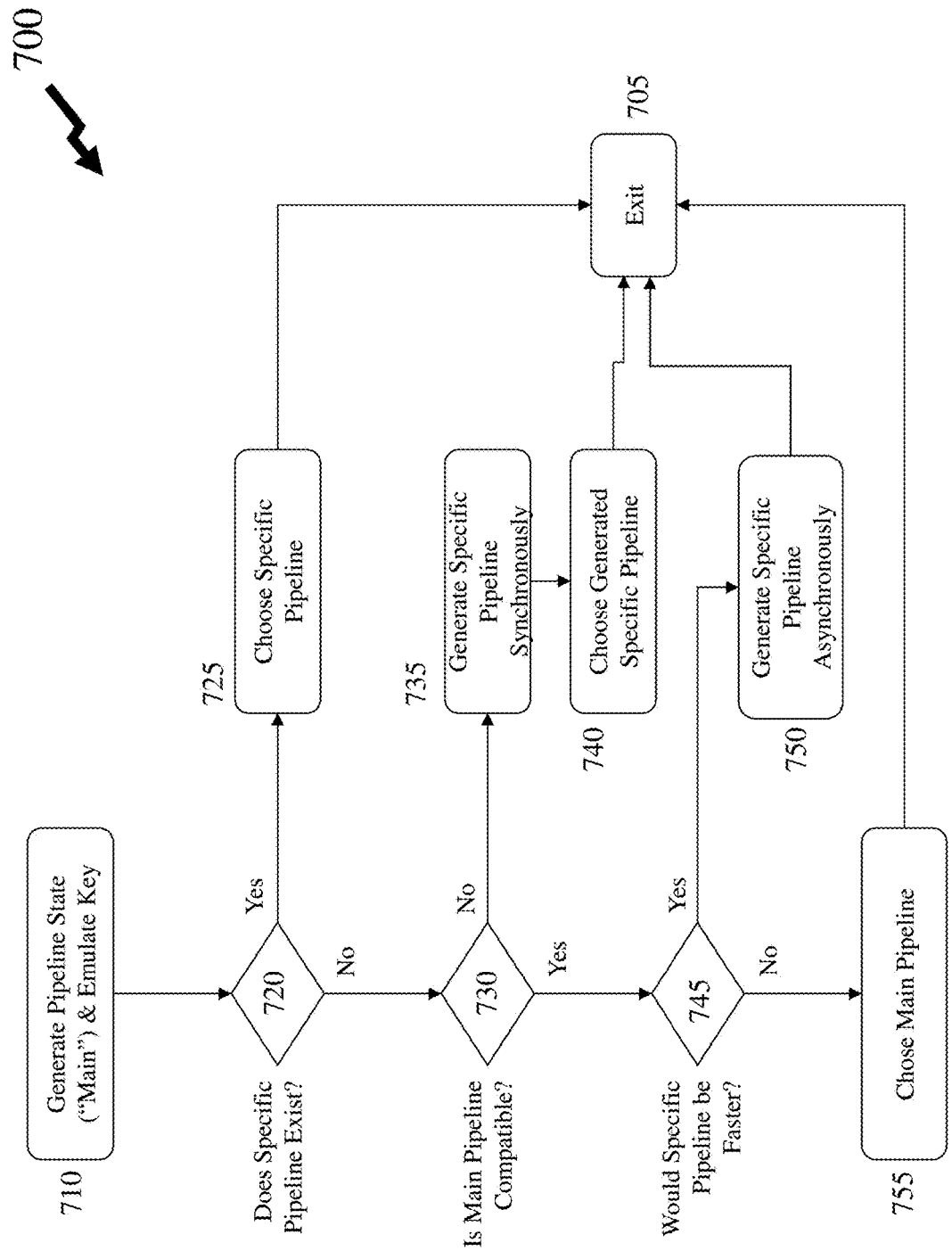
FIG. 7 depicts an exemplary process flow for a graphics pipeline according to an embodiment of the invention.

As described and depicted in respect of FIG. 7 then this issue can be addressed by creating a fast "specific" pipeline within a draw call. The mechanism for creating this pipeline is similar to that of creating a Direct3D™ 11 DxRenderPipelineState pipeline. However, it would be evident that such Direct3D™ 11 pipelines where created are specific in their use context rather than generally.

The Metal™ API allows for the compilation of Metal™ code and the creation of Metal™ pipelines asynchronously such that, as described and depicted in FIG. 7, the inventor's process is able to generate a specific DxRenderPipelineState asynchronously and use the "main" pipeline while this specific DxRenderPipelineState is being generated.

It would also be evident to one of skill in the art that the "main" pipeline may also not be compatible with the current draw call parameters. Accordingly, as described and depicted in FIG. 7, the inventor's process generates a specific DxRenderPipelineState synchronously. This may result in lags within the application but such instances of exploiting this part of the inventor's process are not common from the simulations and experimentations performed. In general, the inventive process flow as described and depicted in FIG. 7, seeks to exploit a specific pipeline as this is faster.

Referring to FIG. 7 there is depicted a Flow 700 addressing how a system exploiting embodiments of the invention determines which pipeline to employ from a draw call. Accordingly, the process begins with first step 710 wherein the "main" pipeline state and emulation key are created when application creates the Direct3D™ 12 PSO, step executing before a draw call. From first step 710 the process proceeds to second step 720 and determines whether a specific pipeline already exists to address the draw call being made. If so the process proceeds to third step 725, chooses the specific pipeline and exits in fourth step 705. The fourth step 705 relating to exiting being employed within this specification to denote this specific decision process and action Flow 700 terminating. In each instance from fourth step 705 the overall virtual machine rendering process for the application to which the draw call relates would proceed to execute the established pipeline from Flow 700. It is does not denote termination of the application, for example.

If the determination in second step 720 is that no specific pipeline exists then the process proceeds to fifth step 730 wherein a determination is made as to whether the "main" pipeline is compatible with the current draw call. If the "main" pipeline is compatible, then the process proceeds to eighth step 745 otherwise it proceeds to sixth step 735. In sixth step a specific pipeline is generated synchronously, the process proceeds to seventh step 740 to select the generated specific pipeline and then proceeds to exit at fourth step 705.

Where the process proceeds to eighth step 745 then a determination is made as to whether a specific pipeline would be faster than the "main" pipeline or not. If the determination is positive then the process proceeds to ninth step 750, generates a specific pipeline asynchronously, and progresses to exit at fourth step 705. If the determination is negative then the process proceeds to tenth step 755, selects the "main" pipeline, and then proceeds to exit at fourth step 705.

Embodiments of the invention would therefore support the generation of a specific pipeline on an Nth draw call with current emulation parameters. Such a methodology allows the inventor's approach to prevent the creation of extra pipelines. For example, a pipeline may only be used only once, for example during loading, to generate some data.

Accordingly, an initial Metal DxRenderPipelineState may be generated from a Direct3D™ 12 PSO (or Direct3D™ 11 shaders plus additional information) within embodiments of the invention through an emulation key, e.g. Emulation Key 610 in FIG. 6. Within embodiments of the invention the Emulation Key 610 may comprise a single portion or it may contain two portions wherein the Internal Emulation Information 630 is separate to the other portion of the Emulation Key 610.

Within embodiments of the invention the key may comprise two portions. A first portion comprising a pipeline key and a second portion comprising the emulation key, e.g. Emulation Key 610 in FIG. 6. The pipeline key generated from the Direct3D™ 12 PSO creation, is employable discretely within Direct3D™ 11 pipeline emulations. The emulation key is predicted for the "main" pipeline and calculated for a specific pipeline. Accordingly, each Direct3D™ 12 PSO contains a DxRenderPipelineState with an emulation key for it. Accordingly, a Direct3D™ 12 PSO may contain a list of specific pipelines together with their emulation keys.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   generating upon a computer system an emulation key relating to a graphic pipeline for an application executing within a virtual machine associated with a guest operating system (OS) upon the computer system;
   passing one or more unique identifiers with the emulation key;
   establishing whether a cached pipeline object exists within a memory cache accessible to the computer system in dependence upon the emulation key and establishing whether the cached pipeline object exists is further performed in dependence upon the one or more unique identifiers;
   upon a positive determination that the cached pipeline object exists using one or more previously established graphic pipelines defined by the established cached pipeline object; and
   upon a negative determination that the cached pipeline object exists creating one or more new graphic pipelines; wherein
   either the one or more previously established graphic pipelines or the one or more new graphic pipelines are associated with the host OS of the computer system; and
   the one or more unique identifiers and the emulation key are passed from the guest OS to the host OS.

2. The method according to claim 1, wherein
   the emulation key comprises:
   a first portion comprising information established in dependence upon a pipeline state object (PSO) of the guest OS to generate a PSO of the host OS; and
   a second portion comprising information required by the PSO of the host OS not contained within the PSO of the guest OS.

3. The method according to claim 1, wherein
   the emulation key comprises:
   a first portion comprising information established in dependence upon a pipeline state object (PSO) of the guest OS to generate a PSO of the host OS;
   a second portion comprising information required by the PSO of the host OS not contained within the PSO of the guest OS; and
   a third portion comprising a vertex stream stride established from a vertex buffer by a process comprising:
   reading the vertex buffer with a native declaration of the host OS using standard buffers;
   establishing the vertex stream stride from the standard buffers.

4. A method comprising:
   generating upon a computer system an emulation key relating to a current graphic pipeline for an application executing within a virtual machine associated with a guest operating system (OS) upon the computer system;
   establishing whether a cached pipeline object exists within a memory cache accessible to the computer system in dependence upon the emulation key;
   upon a positive determination that the cached pipeline object exists using one or more previously established graphic pipelines defined by the established cached pipeline object; and
   upon a negative determination that the cached pipeline object exists creating one or more new graphic pipelines; wherein
   either the one or more previously established graphic pipelines or the one or more new graphic pipelines are associated with a host OS of the computer system;
   the current graphic pipeline is a Direct3D™ pipeline; and
   the one or more previously established graphic pipelines defined by the established cached pipeline object are Metal™ pipelines.

5. The method according to claim 4, wherein
   the emulation key comprises:
   a first portion comprising information established in dependence upon a pipeline state object (PSO) of the guest OS to generate a PSO of the host OS; and
   a second portion comprising information required by the PSO of the host OS not contained within the PSO of the guest OS.

6. The method according to claim 4, wherein
the emulation key comprises:
  a first portion comprising information established in dependence upon a pipeline state object (PSO) of the guest OS to generate a PSO of the host OS;
  a second portion comprising information required by the PSO of the host OS not contained within the PSO of the guest OS; and
  a third portion comprising a vertex stream stride established from a vertex buffer by a process comprising:
    reading the vertex buffer with a native declaration of the host OS using standard buffers;
    establishing the vertex stream stride from the standard buffers.

7. A method comprising:
generating upon a computer system an emulation key relating to a graphic pipeline for an application executing within a virtual machine associated with a guest operating system (OS) upon the computer system;
establishing whether a cached pipeline object exists within a memory cache accessible to the computer system in dependence upon the emulation key;
upon a positive determination that the cached pipeline object exists using one or more previously established graphic pipelines defined by the established cached pipeline object; and
upon a negative determination that the cached pipeline object exists creating one or more new graphic pipelines; wherein
either the one or more previously established graphic pipelines or the one or more new graphic pipelines are associated with a host OS of the computer system; and
upon the negative determination prior to creating the one or more new graphic pipelines performing additional steps comprising:
  determining whether a previously established main pipeline is compatible with a draw call;
  upon a negative determination that the previously established main pipeline is compatible with a draw call creating the one or more new graphic pipelines synchronously as a new first specific pipeline;
  upon a positive determination that the previously established main pipeline is compatible with a draw call determining whether a new second specific pipeline would be faster than the previously established main pipeline;
  upon a positive determination that the new second specific pipeline would be faster than the previously established main pipeline creating the one or more new graphic pipelines asynchronously as a new second specific pipeline;
  upon a negative determination that the new second specific pipeline would be faster than the previously established main pipeline using the previously established main pipeline.

8. The method according to claim 7, wherein
the previously established main pipeline was established at either launching of the application or upon an initial draw call within the application; and
the previously established main pipeline was established in dependence upon estimated settings for parameters required by a pipeline state object (PSO) of the host OS not contained with a PSO of the guest OS.

9. The method according to claim 7, wherein
the previously established main pipeline was established at either launching of the application or upon an initial draw call within the application;
the previously established main pipeline was established in dependence upon estimated settings for parameters required by a pipeline state object (PSO) of the host OS not contained with a PSO of the guest OS; and
the estimated settings comprise one or more settings selected from the group comprising:
  vertex stream strides;
  an index buffer format;
  a vertex stage state defining whether an emulation pipeline is required to read all vertices explicitly or not;
  a force attribute emulation state relating to enabling of disabling reading attributes for one or more buffers within a vertex shader;
  an index draw call without index buffer defining whether an indexed draw call is made without an index buffer;
  an add start vertex state defining whether to add a start vertex on a graphic processing unit performing one or more aspects of the pipeline; and
  an element defining the vertex topology if the vertex stage state is enabled or vertex shader is emulated within the pipeline.

10. The method according to claim 7, wherein
the emulation key comprises:
  a first portion comprising information established in dependence upon a pipeline state object (PSO) of the guest OS to generate a PSO of the host OS; and
  a second portion comprising information required by the PSO of the host OS not contained within the PSO of the guest OS.

11. The method according to claim 7, wherein
the emulation key comprises:
  a first portion comprising information established in dependence upon a pipeline state object (PSO) of the guest OS to generate a PSO of the host OS;
  a second portion comprising information required by the PSO of the host OS not contained within the PSO of the guest OS; and
  a third portion comprising a vertex stream stride established from a vertex buffer by a process comprising:
    reading the vertex buffer with a native declaration of the host OS using standard buffers;
    establishing the vertex stream stride from the standard buffers.

\* \* \* \* \*